United States Patent

[11] 3,586,351

| [72] | Inventors | John E. Vanderveen;<br>Hans B. Bartholomew, both of San Antonio, Tex. |
|---|---|---|
| [21] | Appl. No. | 836,353 |
| [22] | Filed | June 25, 1969 |
| [45] | Patented | June 22, 1971 |
| [73] | Assignee | The United States of America as represented by the Secretary of the Air Force |

[54] ADAPTER FITTING FOR CONTAINERS HAVING A FLEXIBLE OUTLET
8 Claims, 3 Drawing Figs.

[52] U.S. Cl. .................................................. 285/89, 285/245
[51] Int. Cl. ..................................................... F16l 15/00
[50] Field of Search .......................................... 285/89, 245, 246, 247, 355

[56] References Cited

UNITED STATES PATENTS

| 1,233,401 | 7/1917 | Reeve ......................... | 285/247 |
| 2,937,892 | 5/1960 | Prescott ...................... | 285/245 |
| 3,408,098 | 10/1968 | Wilson ........................ | 285/247 |

FOREIGN PATENTS

| 661,161 | 4/1963 | Canada ....................... | 285/245 |
| 16,159 | 9/1912 | France ........................ | 285/245 |
| 582,877 | 10/1958 | Italy ............................ | 285/247 |

*Primary Examiner*—Dave W. Arola
*Attorneys*—Jacob N. Erlich and Harry A. Herbert, Jr.

ABSTRACT: An adapter fitting for use with a container having a flexible outlet. The adapter fitting has a hollow cylindrical plug integral with a hollow tapered threaded fitting and a hollow cylindrical threaded fitting. In use the cylindrical plug and tapered threaded fitting of the adapter fitting are inserted within the flexible outlet and a locking nut sized to the threaded fittings is screwed thereon fixedly holding the flexible outlet in place.

PATENTED JUN22 1971 3,586,351

INVENTORS
JOHN E. VANDERVEEN
HANS B. BARTHOLOMEW
BY Harry A. Herbert Jr
Jacob N. Erlich
ATTORNEYS

ADAPTER FITTING FOR CONTAINERS HAVING A FLEXIBLE OUTLET

BACKGROUND OF THE INVENTION

This invention relates generally to connectors and, more particularly to a tapered connection adapter or adapter fitting for use primarily in introducing to or removing material from a package having a flexible outlet.

In many instances it becomes necessary to connect the flexible outlet of a package or container with a particular supply source or removing means. Heretofore a valve or complex connector was utilized. Such a connector was inserted within the outlet of a package from which material was to be introduced or removed. This connector usually formed a permanent part of the package and further required to be of exact measurements since it was connected to another element forming part of the supplying or removing means. For example in zero-G feeders utilized in our space program, the connectors heretofore in use added greatly to the weight of the package since each package had to contain its own connector. This increased weight, although small, becomes extremely critical when specific weight requirements are to be met. Since each of such feeders required its own connector, it is obvious that on an extended space trip many such connectors had to be used.

Another problem arose in that the connectors heretofore in use were difficult to manufacture due to the exact measurements required in connecting each such connector to the flexible outlet of the package or container without leakage occurring. If the connector was inaccurately constructed the materials which were to be introduced or removed from the package would flow from around the outlet and thereby cause many complications. Furthermore, with each package having its own connector attached thereto the storage problem was greatly increased in that it now became cumbersome to fold the package for storage purposes.

SUMMARY OF THE INVENTION

The instant invention overcomes the problems heretofore encountered and as set forth in detail hereinabove.

The adapter fitting of this invention described in detail hereinbelow is made of a hollow cylindrical plug integral with a hollow tapered or conical threaded fitting and a hollow cylindrical threaded fitting. A locking nut having a thread sized to the tapered threaded fitting and cylindrical threaded fitting forms the remainder of this invention. The hollow cylindrical plug is of a diameter substantially equal to or slightly less than the diameter of a flexible outlet preferably made of polyethylene leading from the package or container to be used. The locking nut is so designed that when the portion of the nut sized to the tapered threaded fitting is entirely therearound, the portion of the nut sized to the cylindrical threaded fitting is also therearound. A stop means is secured to the end of the cylindrical threaded fitting thus preventing loss of the locking nut when not in use.

The adapter fitting of this invention finds its greatest utility when utilized with the zero-G feeder of our space program in the manner explained in detail hereinabove. By using the adapter fitting of the instant invention it does not become necessary for each feeder or package to contain its own connector. The adapter fitting of this invention therefore can be reuseably inserted within the flexible tubelike outlet of any number of packages or feeders.

In use, the tubelike flexible outlet of a container or package encompasses the hollow cylindrical plug and tapered threaded fitting of the adapter fitting with the locking nut out of position and on the cylindrical threaded portion of the adapter. When the flexible outlet is in place the locking nut is screwed onto the tapered threaded fitting until its cylindrical threaded portion abuts the initial thread of the tapered fitting. This securely and without leakage holds the flexible outlet in place.

It is therefore an object of this invention to provide a hollow adapter fitting which has the ability to introduce or remove materials from a container through a flexible outlet.

It is a further object of this invention to provide an adapter fitting which prevents the leakage of gases, liquids or solids from the flexible outlet of a container.

It is still another object of this invention to provide an adapter fitting which is economical to produce and which utilizes conventional, currently available components that lend themselves to standard mass producing manufacturing techniques.

For a better understanding of the present invention, together with other and further objects thereof, reference is made to the following description taken in connection with the accompanying drawing and its scope will be pointed out with the appended claims.

DESCRIPTION OF THE PREFERRED EMBODIMENT

Figure 1:
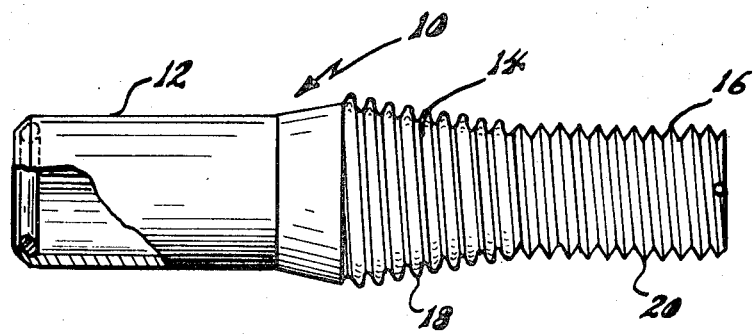
FIG. 1 is an enlarged side elevation view of the adapter fitting of this invention emphasizing the tapered threaded fittings without the locking nut in place, and shown partly in cross section.

Reference is now made to FIG. 1 of the drawing which shows the major portion of the adapter fitting 10 of this invention. This portion of adapter fitting 10 is made up of a hollow cylindrical plug 12 integral with a hollow tapered or conical threaded fitting 14 and a hollow cylindrical threaded fitting 16. The tapered threaded fitting 14 has a plurality of rounded threads 18 thereon, with the largest diameter adjacent the plug 12 tapering to the smallest diameter adjacent fitting 16. The fitting 16 is of a hollow cylindrical configuration and has thereon a plurality of conventional threads 20.

Figure 2:
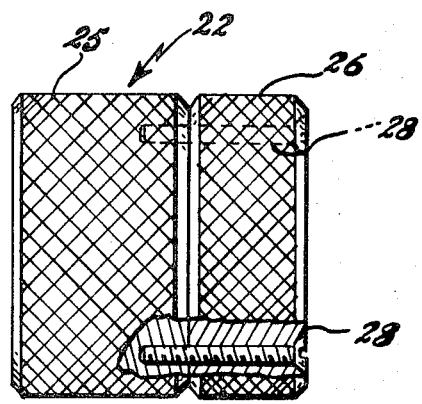
FIG. 2 is an enlarged plan view of the locking nut of the adapter fitting of this invention, shown partly in cross section.
Figure 3:
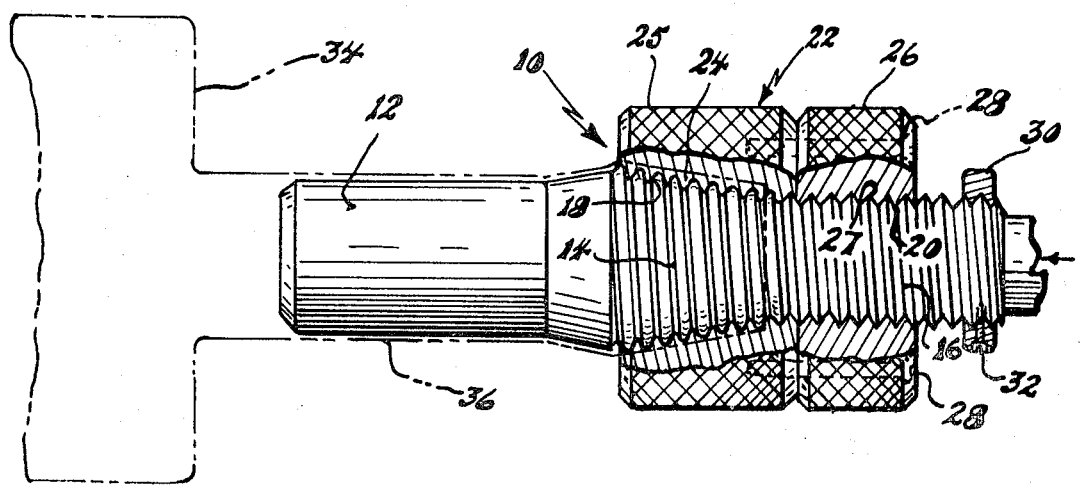
FIG. 3 is an enlarged plan view of the adapter fitting of this invention in combination with the flexible outlet of a container.

The remaining portion of the adapter fitting 10 is best shown in FIG. 2. It is made up of the locking nut 22. This locking nut 22 comprises of two segments. The first segment 25 is of a hollow configuration and has an interior thread 24 (shown in FIG. 3) which is of a tapered configuration, sized to fit the tapered threaded fitting 14. The second segment 26 is of a hollow cylindrical configuration having a conventional thread 27 (shown in FIG. 3). The segment 26 is secured to the first segment 25 of the locking nut 22 by any suitable securing means such as screws 28. Although not shown, the two segments 25 and 26 may also be of a one-piece integral construction. As best shown in FIG. 3, the hollow cylindrical threaded segment 26 has a thread 27 sized to fit and encompass the cylindrical threaded fitting 16. In place, the tapered thread 24 of locking nut 22 surrounds the tapered threaded fitting 14 while the cylindrical thread 27 surrounds the cylindrical threaded fitting 16.

Referring now to FIG. 3, the locking nut 22 is shown in position around the threaded fittings 14 and 16 of adapter fitting 10 holding the flexible outlet 36 of a container 34 in place. A stop means 30 is attached to the end opposite plug 12 of cylindrical threaded fitting 16 by any suitable securing means such as set screw 32. This stop means prevents the locking nut 22 from being accidentally removed when unscrewed from the tapered threaded fitting 14.

MODE OF OPERATION

The adapter fitting 10 of this invention can be reuseably attached to any number of suitable packages or containers 34 having a flexible outlet 36 made of any suitable material such as polyethylene. In use the hollow cylindrical plug 12 and tapered threaded fitting 14 of adapter fitting 10 are inserted within the flexible outlet 36 of a container 34. The only stipulation in the construction of adapter fitting 10 being that the diameter of the cylindrical plug 12 be substantially equal to or slightly less than the diameter of the flexible outlet 36. When the flexible outlet 36 is mounted over both the cylindrical plug 12 and the tapered threaded fitting 14 the locking nut 22 should be in its inoperative position (not shown). The inoperative position being when the cylindrical segment 26 is abutting stop means 30 and the outlet 36 can be inserted between fitting 14 and locking nut 22. Once the flexible outlet is in place the locking nut 22 can be screwed onto the tapered threaded fitting 14 over the flexible outlet 36 which is already in position. Because of the rounded threads 18 the flexible outlet 36 is not damaged in any manner during tightening of locking nut 22, and because the tapered threaded fitting 14 and threads 24 are properly sized the locking nut 22 securely affixes the flexible outlet 36 to the adapter fitting 10.

Once in place, liquid, gas or solid material can be either introduced to or removed from the container 34 by means of the hollow adapter fitting 10 of this invention. When not in use the container 34 can be easily removed from the adapter fitting 10 by reversal of the procedure described hereinabove The locking nut 22 is unscrewed from the tapered threaded fitting 14 until its cylindrical segment 26 abuts the stop means 30, whereupon the adapter fitting 10 can be withdrawn from the flexible outlet 36 and either stored separately from or put in use with another such container 34. The adapter fitting 10 of this invention has thus overcome the weight requirements and the complex design heretofore encountered in such connectors and provides a much more practical connector than used in the prior art.

Although the invention has been described with reference to a particular embodiment, it will be understood to those skilled in the art that the invention is capable of a variety of alternative embodiments within the spirit and scope of the appended claims.

We claim:

1. An adapter fitting comprising a hollow cylindrical plug integral with a hollow, tapered threaded fitting and a hollow, cylindrical threaded fitting, said tapered threaded fitting having its largest diameter adjacent said plug and its lesser diameter adjacent said cylindrical threaded fitting, the outside diameter of said cylindrical threaded fitting being no greater than said lesser diameter of said tapered threaded fitting, a locking nut capable of encompassing said threaded fittings and having a tapered threaded segment sized to mate said tapered threaded fitting and a cylindrical threaded segment sized to mate said cylindrical threaded fitting.

2. An adapter fitting as defined in claim 1 wherein the threads of said tapered threaded fitting are round.

3. An adapter fitting as defined in claim 2 wherein a stop means for preventing said locking means from being accidentally removed is secured to said hollow cylindrical fitting.

4. The combination of a container and an adapter fitting comprising said container having a flexible outlet of a predetermined diameter, said adapter fitting having a hollow cylindrical plug integral with a hollow, tapered threaded fitting and a hollow, cylindrical threaded fitting, said tapered threaded fitting having its largest diameter adjacent said plug and its lesser diameter adjacent said cylindrical threaded fitting, the outside diameter of said cylindrical threaded fitting being no greater than said lesser diameter of said tapered threaded fitting, a locking nut capable of encompassing said threaded fittings and having a tapered threaded segment sized to mate said tapered threaded fitting and a cylindrical threaded segment sized to mate said cylindrical threaded fitting, whereby said hollow cylindrical plug and said tapered threaded fitting are inserted within said flexible outlet and said locking nut is screwed into position over said flexible outlet in order to form a seal between said outlet and said adapter fitting.

5. The combination as defined in claim 4 wherein the threads of said tapered threaded fitting are round.

6. The combination as defined in claim 5 wherein a stop means for preventing said locking means from being accidentally removed is secured to said hollow cylindrical fitting.

7. The combination as defined in claim 6 wherein said flexible outlet is made of polyethylene.

8. The combination as defined in claim 7 wherein the exterior diameter of said cylindrical plug is less than the diameter of said flexible outlet.